Figure 1:
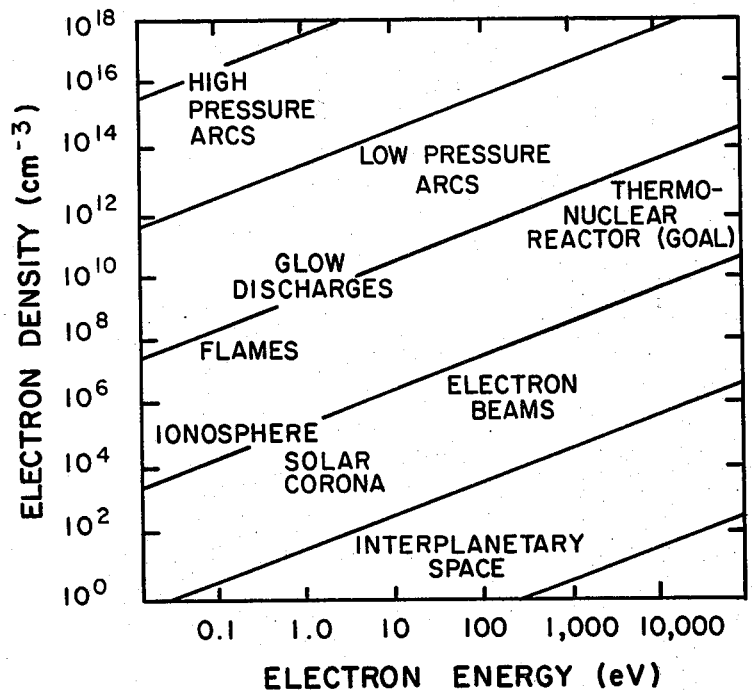

United States Patent [19]

Auerbach et al.

[11] 4,366,184
[45] Dec. 28, 1982

[54] METHOD FOR BONDING SILICONE ELASTOMERS TO METAL SUBSTRATES

[75] Inventors: Robert A. Auerbach, Allison Park; Herman V. Boenig, Erie, both of Pa.

[73] Assignee: Lord Corporation, Erie, Pa.

[21] Appl. No.: 276,215

[22] Filed: Jun. 22, 1981

[51] Int. Cl.³ .............................................. B05D 3/06
[52] U.S. Cl. ..................................... 427/41; 427/409
[58] Field of Search ................. 427/34, 38, 41, 327, 427/409

[56] References Cited

U.S. PATENT DOCUMENTS 3,395,069 7/1968 Plueddeman ..................... 156/272
3,398,210 8/1968 Plueddemann et al. ............. 525/43
4,260,647 4/1981 Wang et al. ........................ 427/41
4,264,642 4/1981 Ferralli ............................. 427/38

FOREIGN PATENT DOCUMENTS 47801 1/1978 Japan ................................. 427/41

Primary Examiner—Shrive P. Beck
Attorney, Agent, or Firm—John A. Gazewood

[57] ABSTRACT

Adhesion of silicone elastomers to metal substrates, especially zinc phosphatized metal substrates, is significantly improved by exposing the substrate to a plasma comprising at least one organosilicon compound. In a preferred embodiment, the plasma-treated substrates are soaked in gaseous organosilicon monomer compound.

12 Claims, 2 Drawing Figures

METHOD FOR BONDING SILICONE ELASTOMERS TO METAL SUBSTRATES

This invention relates to bonding of elastomeric compositions. More particularly, the invention is concerned with the bonding of vulcanizable silicone elastomers to metal substances, especially to zinc-phosphatized metal substrates.

Laminates and composite structures wherein natural and synthetic elastomers are adhesively bonded to metal substrates are well known. There are any number of general purpose adhesives which can be used alone or in combination with metal adhesive primers which are effective to provide rubber-tearing bonds, the desired failure condition of rubber-metal bonded assemblies, and at least moderate levels of environmental resistance with the more common elastomers, such as natural, neoprene and SBR rubbers. Either or both adhesion and environmental resistance can generally be improved by the use of conversion treatments, such as zinc phosphatizing. However, conventional rubber-metal adhesive systems are generally ineffective with specialty elastomers, such as silicone, fluorocarbon and polyester rubbers, which are especially suited for many applications because of their unusual characteristics, such as high heat resistance or chemical resistance. Such specialty elastomers generally require specific adhesives especially tailored to the elastomers. In application areas requiring bonding of specialty elastomers to treated metals, such as zinc-phosphatized steel, even the use of adhesive systems especially tailored for the elastomer are not effective to obtain desired levels of adhesion. To overcome this problem, either the adhesive must be modified or the treated metal subjected to further treatment, and at times both, in order to enhance the adhesion between the elastomer and the treated metal. While solutions to this problem are known, there is nevertheless a continuing need for other alternative solutions.

The present invention provides a novel and unobvious method of enhancing the adhesion of vulcanizable silicone elastomer compositions to metal substrates, especially to phosphatized metal substrates, without the use of an intermediate silicone rubber-to-metal adhesive, through the use of gas plasma processes. More particularly, the bonding method of the present invention comprises treating the metal substrate in the presence of certain plasmas, contacting the plasma-treated metal substrate with a vulcanizable silicone rubber composition, and subjecting the resulting assembly to conditions of heat and pressure for a time sufficient to effect vulcanization of the rubber composition. If desired, the cured assembly can be subjected to a post-vulcanization cure to more completely develop optimum properties of the silicone elastomer. Broadly, the present invention provides a gas phase plasma coating process wherein there is deposited on the metal substrate an impervious polymeric film. The thin film exhibits excellent adhesion to the metal and provides a protective primer coating which is compatible with vulcanizable silicone elastomer compositions and can bond directly to such silicone elastomers without the use of conventional silicone rubber-to-metal adhesives.

FIG. 1 discloses types and properties of known electrical discharges; and

Figure 2:
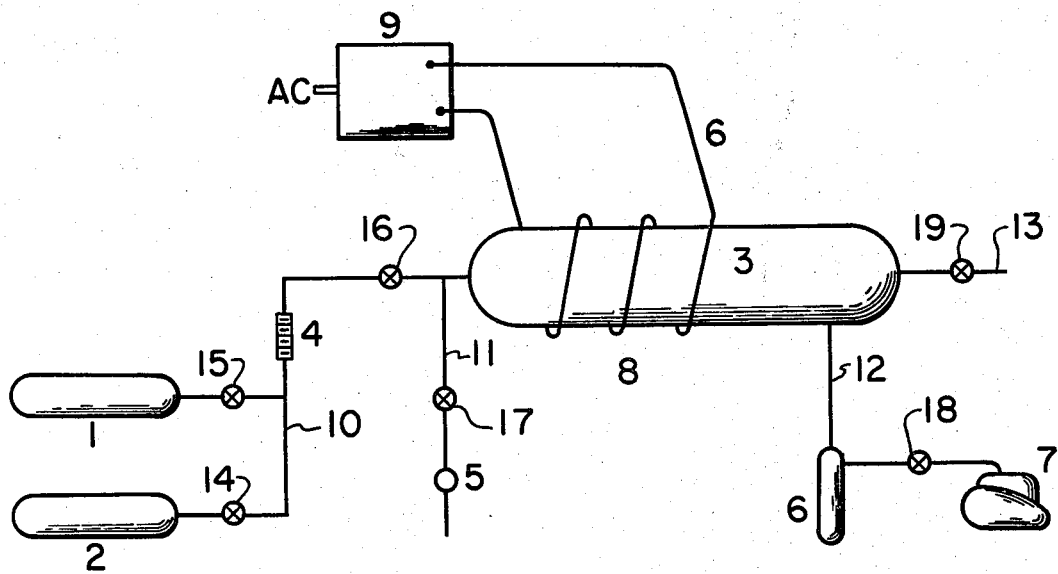

FIG. 2 is a schematic diagram of an apparatus which can be employed in the practice of the invention.

Plasma chemistry deals with chemical reactions which occur in an at least partially ionized gas which is composed of ions, free radicals, and neutrals. This "fourth state of matter" can be achieved by the action of very high temperatures or strong electrical or magnetic fields. The present invention is concerned with ionized gases produced by an electrical discharge in a gaseous medium. In such a discharge, free electrons gain energy from the applied electric field and collide with neutral gas molecules. In the process, energy is transferred to the molecules and leads to the formation of a plethora of new specie, including free radicals (molecular specie with unpaired electrons), ions (specie with whole positive or negative charges), atoms and metastables (energetic fragments which are transient and decay to lower energy states). These various specie are available to participate in different chemical and physical processes.

Of the several types of electrical discharges which can create plasmas, see FIG. 1, the present invention utilizes those plasmas generally characterized as "glow discharges" and which are defined by electron energies of 1–10 eV and electron densities of $10^{9}$–$10^{12}$ cm$^{-3}$. Additionally, such plasmas lack equilibrium between the electron temperature Te and the gas temperature Tg. Typically, ratios for Te/Tg lie in the range 10–$10^2$. This lack of thermal equilibrium can provide a plasma in which the gas temperature is near ambient value but in which electron energies are sufficiently high to rupture molecular bonds and kinetically cause other transformations. Depending on the gaseous medium, plasmas may be chemically reactive, that is, the plasma gas components may become involved in substrate surface reactions, or non-reactive, that is, the plasma gas components do not become involved in such substrate reactions. These non-reactive plasmas are usually regarded as predominatly physical processes in which the eneroetic ions, although unable to react chemically with the substrate surface, impart kinetic energy and momentum to surface atoms or molecules to eject from the surface.

The "low temperature" or non-equilibrium electric glow discharge plasmas which are utilized in the practice of the invention typically involve coupling radio frequency or microwave power to a discharge zone, with the former being currently preferred. At RF frequencies, either inductive or capacitative types of coupling are employed. Suitable plasmas can be formed with a radio frequency discharge operated between 0 to 100 megahertz and 1 to 600 watts or with a microwave discharge operated between 100 to 4000 megahertz and 20 to 400 watts. The wattage considerations are based on a five inch diameter reactor and will vary somewhat with reactor size. The residence or treating period within the reaction zone is generally from 10 minutes to 20 hours, preferably 30 minutes to 2 hours, although residence times outside these limits can often be advantageous.

Substantially any metal substrate, including substrates which have been treated by any known surface treating process such as chemical conversion coatings, nitriding and the like can be treated in accordance with the invention. The methods of the invention are also suitable for treating metal substrates which have been otherwise untreated, except for appropriate cleaning, such as degreased, rinsed and/or sand blasted. Ferrous-based metals, especially phosphatized ferrous-based metals, are preferred substrates.

Metal substrates are prepared for bonding to vulcanizable silicone rubber in accordance with this invention by a treatment comprising exposing at least that portion of the metal substrate which is to be subsequently bonded in a zone of electrical discharge plasma to a gaseous medium comprising at least one organosilicon monomer in vaporized form. It is critical that the entire portion of the substrate which is to be bonded be entirely within the visible plasma zone. In a particularly preferred embodiment, the metal substrates are soaked in gaseous organosilicon monomer compound for from 5 minutes to 6 hours following their exposure to the organosilicon plasma.

Silicon rubbers which can be more effectively bonded to metal substrates in accordance with this invention comprise substantially any of the currently available heat-curable elastomeric organosilicon polymers, that is, organopolysiloxanes, which, upon heating in combination with an appropriate curing agent, are converted to the solid, elastic state. Silicone elastomers are well known in the art and the specific silicone rubber which is employed in the practice of the invention is not critical and may be selected from any of the currently available varieties. As is conventional, the silicone rubber may contain a curing agent, such as benzoyl peroxide or di-t-butyl peroxide, as well as conventional fillers and other rubber compounding materials.

The organosilicon compounds suitable for use in the reactive plasmas of this invention can be broadly described as vaporizable organosilane monomer compounds having the formula

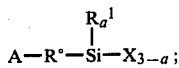

wherein $R^o$ is a divalent saturated or unsaturated acyclic, saturated or unsaturated cyclic or aromatic radical having from one to 20 carbon atoms, and is preferably an alkylene radical having from 2 to 11 carbon atoms;

$R^1$ is hydrogen, halogen or a monovalent aliphatic, cycloaliphatic or aromatic radical having from 1 to 20 carbon atoms and is preferably selected from the group consisting of chlorine, bromine, an alkyl radical having from 1 to 4 carbon atoms, a cycloalkyl radical having from 4 to 7 ring carbon atoms, and aryl radicals having 6, 10 or 14 nuclear carbon atoms, and including such aryl radicals having one or more substituent alkyl groups having from one to 4 carbon atoms;

X is halogen or $-OR^2$, wherein $R^2$ is hydrogen or a monovalent aliphatic, cycloaliphatic or aromatic radical containing from 1 to 8 carbon atoms and is preferably selected from the group consisting of alkyl radicals having from one to 4 carbon atoms, $-R-O-R^4$ and

wherein $R^3$ is an alkylene group having from one to 4 atoms and $R^4$ is an alkyl group having from one to 4 carbon atoms;

A is selected from the group consisting of hydrogen; hydroxy; amino having the formula $-NH-R^5$, wherein $R^5$ is selected from the group consisting of hydrogen, monovalent aliphatic radicals containing from one to 8 carbon atoms, monovalent cycloaliphatic radicals containing from 4 to 7 ring carbon atoms, phenyl, alkaryl radicals having 6 nuclear carbon atoms and containing one or more substituent alkyl groups having from one to 4 carbon atoms and $-R^6-NH-R^7$, wherein $R^6$ is selected from the group consisting of divalent aliphatic, cycloaliphatic and aromatic radicals having from one to 20 carbon atoms, there being preferably at least two carbon atoms separating any pair of nitrogen atoms, with $R^6$ being preferably an alkylene group having from 2 to 9 carbon atoms and $R^7$ is the same as $R^5$ and is preferably hydrogen; mercapto; oxirane; carboxyl; isocyanato; acryloxy and methyl acryloxy; and a is zero or one, and is preferably zero. Representative organosilicon compounds include, without limitation thereto, ethyltriethoxysilane, ethyltripropoxysilane, vinyltributoxysilane, phenyltriethoxysilane, vinyltriacetoxysilane, vinyl(trimethoxyethoxy)silane, gamma-methcryloxytrimethoxysilane, gamma-aminopropyltriethoxysilane, gamma-aminoisobutyltriethoxysilane, gamma-aminopropylphenyldiethoxysilane, delta-aminobutylmethyldiethoxysilane, deltaaminobutylcyclohexyldiethoxysilane, N-methyl-gamma-aminopropyltriethoxysilane, N-phenyl-gamma-aminodisobutylmethyldiethoxysilane, N-beta-aminoethyl-gamma-aminoisobutyltriethoxysilane, hydroxypropyltrimethoxysilane, hydroxybutytrimethoxysilane, gamma-mercaptopropyltrimethoxysilane, mercaptoethyltriethosysilane, triethoxysilylpropylisocyanate, phenyldiethoxysilylpropylisocyanate, methyldimethoxysilylbutylisocyanate, chloromethyltriethoxysilane, methylchloromethyltriethoxysilane, methylbromomethyldiethoxysilane and methylchloromethyldibutoxysilane.

The organosilicon plasma-treated metal substrates are subsequently brought into direct contact with the heat-vulcanizable silicone rubber composition in the substantial absence of any silicone rubber-to-metal adhesive. The resultant assembly is then subjected to appropriate conditions of heat and pressure for a time sufficient to cure the silicone rubber. Following this initial cure, the vulcanized assemblies can be post-vulcanization cured in a known manner.

The invention will be more fully described with reference to FIG. 2, which is a schematic diagram of an apparatus which can be employed in the practice of the invention.

As shown in FIG. 2, there are provided non-reactive gas and reactive monomer reservoirs 1 and 2, respectively with conduit means for delivery to reactor 3. A flowmeter 4 is provided for measuring gas flow rates and a vacuum gauge 5 is provided in conduit 11 to monitor the pressure within the reactor system. Valves 14, 15, 16 and 17 are provided in conduits 10 and 11 to regulate the flow rate of non-reactive gas and reactive monomer materials to reactor 3. Prior to use, reactor 3 is evacuated by opening valve 18 to vacuum source 7. A suitable helical coil 8 is connected to a suitable radio frequency oscillator 9, which can be operated at a frequency in the range from 0 to 100 megahertz. Substrates to be treated with the invention are placed on an appropriate rack not shown, in a staggered configuration and disposed within the reaction zone. The bond surface area of the substrates must be located entirely within the visible plasma region. The reactor system also includes a trap 6 and vent conduit 13 and its valve 19.

The following example is illustrative of the present invention. It should be understood that the example is not to be construed so as to unduly limit the invention. In the Example, unless otherwise noted, the equipment is operated at a frequency of 21.0 megahertz with a power input of 40 watts and a system pressure with non-reactive gas of 20-2000 microns and with reactive monomer of 10 to 100 microns. The reactor is loaded with cold rolled steel substrates which have the following surface treatments: (1.) Solvent degreased, (2.) grit blasted, and degreased, and, (3.) phosphatized. The substrates are located in a staggered configuration within the boundaries defined by the helical coil. The reaction chamber is evacuated to a pressure of 5-10 microns and flushed with argon gas at a pressure of 20-2000 microns; and then adjusted to a pressure of 10 to 100 microns of reactive organosilicon monomer, using an equal volume mixture of gamma-aminopropyltriethoxysilane and vinyltriethoxysilane. The substrates are exposed to the organosilicon plasma for two hours, the plasma is terminated and the plasma-treated substrates are soaked in the gaseous mixture of organosilicon monomers for 15 minutes. The plasma-treated substrates are removed from the reaction zone and bonded to heat-vulcanizable silicone rubber stock both with and without the use of an inert organic solution of tetraethylorthosilicate silicone rubber-to-metal adhesive. Additional cold rolled steel substrates which have been, (1) grit blasted, (2), phosphatized and, (3), grit blasted and phosphatized, but which are not plasma treated, are bonded to the same silicone rubber composition using the tetraethylorthosilicate adhesive. In all cases, the vulcanized assemblies are further subjected to a 36-hour stepped oven cure, with the final 24 hours being at 177° C. The bonded assemblies are tested in accordance with ASTM D429, Method B, modified to 45°. The results are reported in Table I.

TABLE I

| Substrate Treatment | Adhesion, psi |
| --- | --- |
| Phosphatized, single dip in adhesive | 12.3 |
| Grit blasted and phosphatized, single dip in adhesive | 13.3 |
| Grit blasted, single dip in adhesive | 14.7 |
| Solvent degreased, plasma treated, no adhesive | 15.5 |
| Grit blasted, degreased, plasma treated, no adhesive | 15.0 |
| Phosphatized, plasma treated, no adhesive | 16.1 |
| Degreased, plasma treated, single dip in adhesive | 10.0 |
| Grit blasted, plasma treated, single dip in adhesive | 10.0 |
| Phosphatized, plasma treated, single dip in adhesive | 9.8 |

The data clearly show the effectives of organosilicon monomer plasma treatment for bonding metal substrates to unvulcanized silicone rubber without using conventional silicone rubber-metal adhesives. Particularly noteworthy is the improvement in the case of phosphatized metal substrates, as is the drastic decrease in bond strength when plasma treated substrates are employed in combination with adhesives.

What is claimed is:

1. A method for bonding vulcanizable silicone elastomer compositions to metal substrates comprising:
   (a) treating at least one metal substrate in a plasma comprising at least one organosilicon monomer having the formula

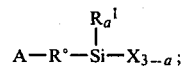

wherein
   $R^o$ is a divalent aliphatic, cycloaliphatic or aromatic radical having from one to 20 carbon atoms;
   $R^1$ is hydrogen, halogen or a monovalent aliphatic, cycloaliphatic or aromatic radical having from 1 to 20 carbon atoms;
   X is halogen or $-OR^2$, wherein $R^2$ is halogen or a monovalent aliphatic, cycloaliphatic or aromatic radical having from 1 to 8 carbon atoms;
   A is selected from the group consisting of hydrogen, hydroxy, mercapto, oxirane, carboxyl, isocyanato, acryloxy, methacryloxy and amino having the formula $-NH R^5$, wherein $R^5$ is selected from the group consisting of hydrogen, monovalent aliphatic radicals containing from one to 8 carbon atoms, monovalent cycloaliphatic radicals having from 4 to 7 ring carbon atoms, phenyl, alkaryl radicals having 6 nuclear carbon atoms and containing one or more substituent alkyl groups having from one to 4 carbon atoms and $-R^6-NH-R^7$, wherein $R^6$ is selected from the group consisting of divalent aliphatic, cycloaliphatic and aromatic radicals having from 1 to 20 carbon atoms, and $R^7$ is the same as $R^5$; and
   a is zero or one;
   (b) contacting such plasma-treated metal substrate with a vulcanizable silicone rubber composition; and
   (c) subjecting the resultant assembly to conditions sufficient to vulcanize said elastomer.

2. A method according to claim 1 wherein said substrate is phosphatized metal.

3. A method according to claim 1 wherein said organosilicon plasma comprises a mixture of gamma-aminopropyltriethoxysilane and vinyltriethoxysilane.

4. A method according to claim 3 wherein said substrate is phosphatized metal.

5. A method according to claim 1 comprising:
   (a) treating at least one metal substrate in a plasma comprising at least one organosilicon monomer having the formula

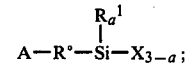

wherein
   $R^o$ is a divalent saturated or unsaturated acyclic, saturated or unsaturated cyclic or aromatic radical having from one to 20 carbon atoms;
   $R^1$ is hydrogen, halogen or a monovalent aliphatic, cycloaliphatic or aromatic radical having from 1 to 20 carbon atoms;
   X is halogen or $-OR^2$, wherein $R^2$ is halogen or a monovalent aliphatic, cycloaliphatic or aromatic radical having from 1 to 8 carbon atoms;
   A is selected from the group consisting of hydrogen, hydroxy, mercapto, oxirane, carboxyl, isocyanato, acryloxy, methacryloxy and amino having the formula $-NH-R^5$, wherein $R^5$ is selected from the group consisting of hydrogen, monovalent aliphatic radicals containing from one to 8 carbon atoms, monovalent cycloaliphatic radicals having from 4 to 7 ring carbon atoms, phenyl, alkaryl radicals having 6 nuclear carbon atoms and containing one or more substituent alkyl groups having from one to 4 carbon atoms and $-R^6-NH-R^7$, wherein $R^6$ is selected from the group consisting of divalent aliphatic, cycloaliphatic and aromatic radicals having from one to 20 carbon atoms, and $R^7$ is the same as $R^5$; and a is zero or one, (b) soaking such plasma-treated metal substrate in gaseous organosilicon monomer having the formula

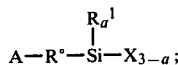

wherein $R^o$, $R^1$, X, A and a are as previously defined;

(c) contacting such plasma-treated metal substrate with a vulcanizable silicone rubber composition; and (d) subjecting the resultant assembly to conditions sufficient to vulcanize said elastomer.

6. A method according to claim 5 wherein said substrate is phosphatized metal.

7. A method according to claim 5 wherein said organosilicon plasma comprises a mixture of gamma-aminopropyltriethoxysilane and vinyl triethoxysilane.

8. A method according to claim 7 wherein said gaseous organosilicon monomer comprises a mixture of gamma-aminopropyltriethoxysilane and vinyltriethoxysilane.

9. A method according to claim 8 wherein said substrate is phosphatized metal.

10. A method for enhancing adhesion between a metal substrate and vulcanizable silicone rubber comprising treating said substrate in an electrical discharge plasma comprising at least one organosilicon monomer having the formula

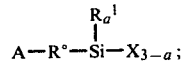

wherein $R^o$ is a divalent saturated or unsaturated acyclic, saturated or unsaturated cyclic or aromatic radical having from one to 20 carbon atoms;

$R^1$ is hydrogen, halogen or a monovalent aliphatic, cycloaliphatic or aromatic radical having from 1 to 20 carbon atoms;

X is halogen or $-OR^2$, wherein $R^2$ is halogen or a monovalent aliphatic, cycloaliphatic or aromatic radical having from 1 to 8 carbon atoms;

A is selected from the group consisting of hydrogen, hydroxy, mercapto, oxirane, carboxyl, isocyanato, acryloxy, methacryloxy and amino having the formula $-NH-R^5$, wherein $R^5$ is selected from the group consisting of hydrogen, monovalent aliphatic radicals containing from one to 8 carbon atoms, monovalent cycloaliphatic radicals having from 4 to 7 ring carbon atoms, phenyl, alkaryl radicals having 6 nuclear carbon atoms and containing one or more substituent alkyl groups having from one to 4 carbon atoms and $-R^6-NH-R^7$, wherein $R^6$ is selected from the group consisting of divalent aliphatic, cycloaliphatic and aromatic radicals having from one to 20 carbon atoms, and $R^7$ is the same as $R^5$; and a is zero or one.

11. A method according to claim 10 wherein said organosilicon plasma comprises and admixture of gamma-aminopropyltriethoxysilane and vinyltriethoxysilane.

12. A method according to claim 10 wherein said substrate is soaked in at least one gaseous organosilicon monomer having the formula

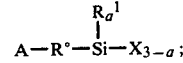

wherein $R^o$, $R^1$, X, and A and a are as previously defined.

* * * * *